(12) United States Patent
Kim et al.

(10) Patent No.: US 12,294,536 B2
(45) Date of Patent: May 6, 2025

(54) OBFUSCATION METHOD FOR CONTROLLER AREA NETWORK MESSAGE

(71) Applicant: KOREA UNIVERSITY RESEARCH AND BUSINESS FOUNDATION, Seoul (KR)

(72) Inventors: Huy Kang Kim, Seoul (KR); Hwejae Lee, Seoul (KR); Sangho Lee, Seoul (KR); Yeon Jae Kang, Namyangju-si (KR); Daekwon Pi, Goyang-si (KR); Jae Woong Choi, Seoul (KR); Huiju Lee, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 18/467,815

(22) Filed: Sep. 15, 2023

(65) Prior Publication Data
US 2024/0097841 A1    Mar. 21, 2024

(30) Foreign Application Priority Data
Sep. 15, 2022 (KR) .......................... 10-2022-0116348

(51) Int. Cl.
*H04L 5/00*          (2006.01)
*H04L 12/40*       (2006.01)

(52) U.S. Cl.
CPC ............ *H04L 5/0044* (2013.01); *H04L 12/40* (2013.01); *H04L 2012/40215* (2013.01)

(58) Field of Classification Search
CPC ......... H04L 2012/40273; H04L 5/0044; H04L 12/40; H04L 2012/40215; H04L 63/0428; H04L 63/123; H04L 12/40104; H04L 9/3239
See application file for complete search history.

(56) References Cited

U.S. PATENT DOCUMENTS

| | | | |
|---|---|---|---|
| 10,958,680 B2 | 3/2021 | Jain et al. | |
| 2015/0089236 A1 | 3/2015 | Han et al. | |
| 2021/0271626 A1* | 9/2021 | Nasser | H04L 9/0631 |
| 2024/0007831 A1* | 1/2024 | Adachi | H04W 4/44 |

FOREIGN PATENT DOCUMENTS

| | | |
|---|---|---|
| CN | 104301177 A | 1/2015 |
| JP | 6822556 B2 | 1/2021 |
| KR | 10-1721035 B1 | 3/2017 |
| KR | 10-2064684 B1 | 1/2020 |
| KR | 10-2243114 B1 | 4/2021 |
| KR | 10-2269220 B1 | 6/2021 |
| KR | 10-2022-0094857 A | 7/2022 |
| KR | 10-2022-0121493 A | 9/2022 |

OTHER PUBLICATIONS

Korean Office Action issued on Dec. 14, 2024, in counterpart Korean Patent Application No. 10-2022-0116348 (5 pages in English, 5 pages in Korean).

* cited by examiner

*Primary Examiner* — Soe Hlaing
(74) *Attorney, Agent, or Firm* — NSIP Law

(57) ABSTRACT

Disclosed is a method of obfuscating a Controller Area Network (CAN) message performed by a first computing device including a processor, the method including: obtaining a first index from a first input value corresponding to a first time point by using an index output algorithm; determining a first CAN ID of the first computing device corresponding to the first index based on a predetermined CAN ID table; and generating a first normal CAN message including the first CAN ID and first normal data.

11 Claims, 10 Drawing Sheets

[FIG. 1]
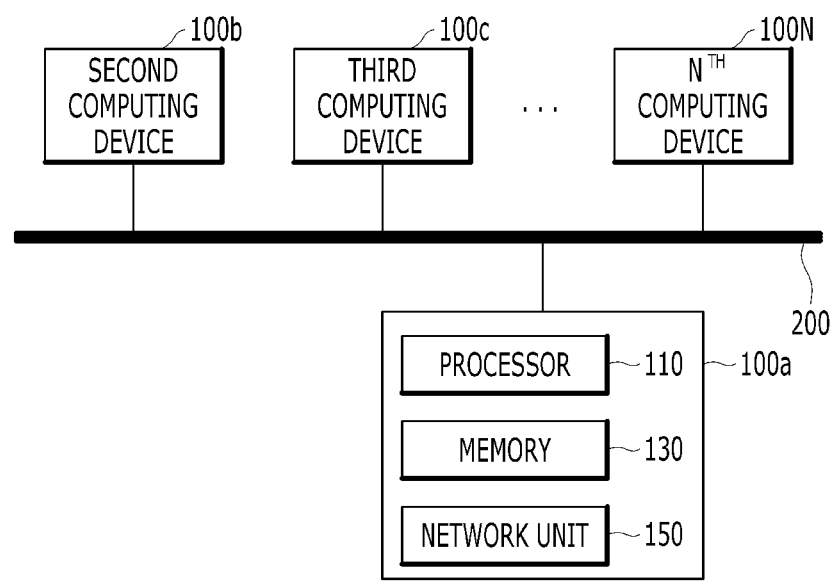

[FIG. 2]
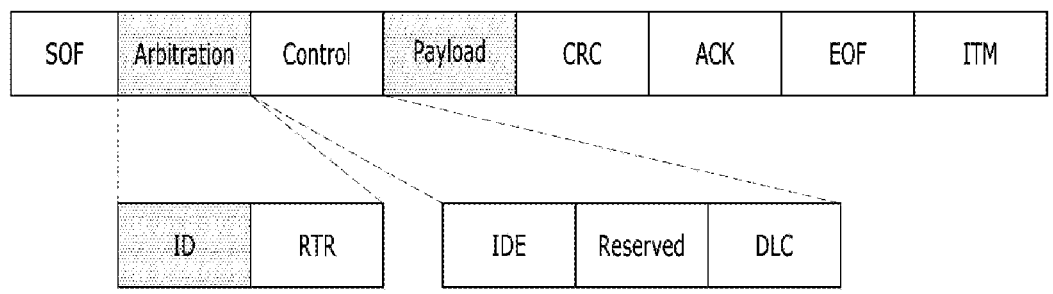

[FIG. 3]

|  | 1 | 2 | 3 | ... | ... | ... | ... | N-2 | N-1 | N |
|---|---|---|---|---|---|---|---|---|---|---|
| FIRST COMPUTING DEVICE | 0x110 | 0x115 | 0x112 | ... | ... | ... | ... | 0x11a | 0x11b | 0x11c |
| SECOND COMPUTING DEVICE | 0x7ae | 0x7bc | 0x7ab | ... | ... | ... | ... | 0x12a | 0x12b | 0x12c |
| THIRD COMPUTING DEVICE | 0x53d | 0x54a | 0x552 | ... | ... | ... | ... | 0x13a | 0x13b | 0x13c |
| FOURTH COMPUTING DEVICE | 0xe32 | 0xe33 | 0x552 | ... | ... | ... | ... | 0x14a | 0x14b | 0x14c |
| ⋮ | ⋮ | ⋮ | ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ | ⋮ | ⋮ |
| N$^{TH}$ COMPUTING DEVICE | 0x115 | 0x112 | 0xe34 | ... | ... | ... | ... | 0x17a | 0x17b | 0x17c |

[FIG. 4]
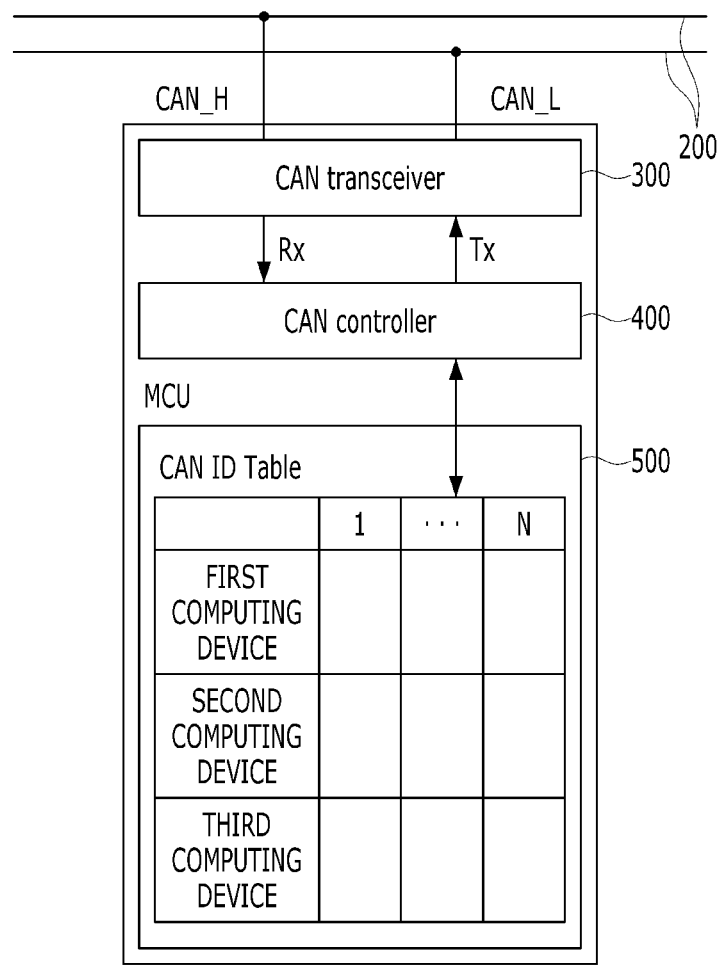

[FIG. 5]
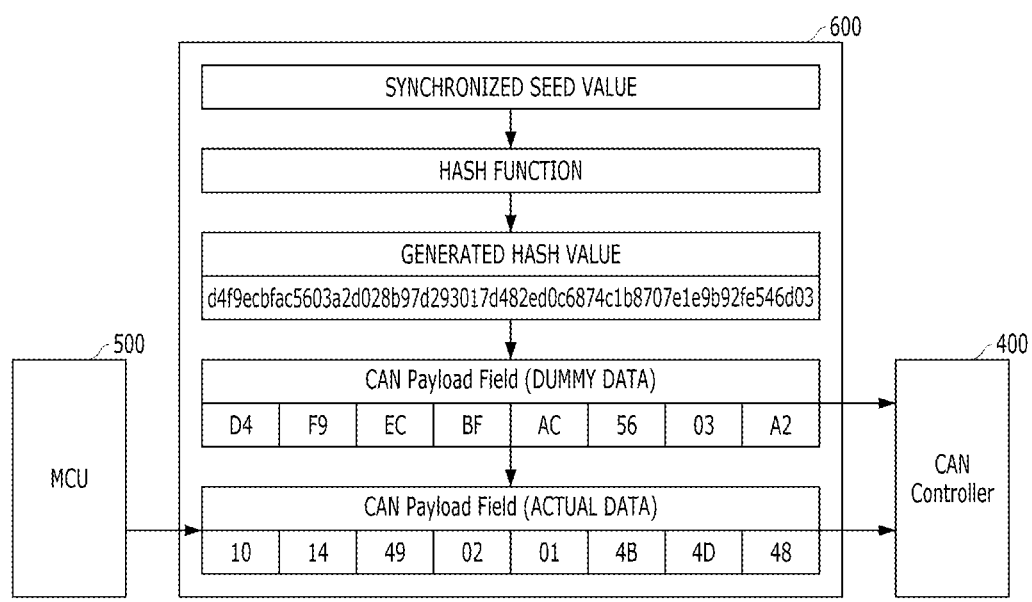

[FIG. 6]
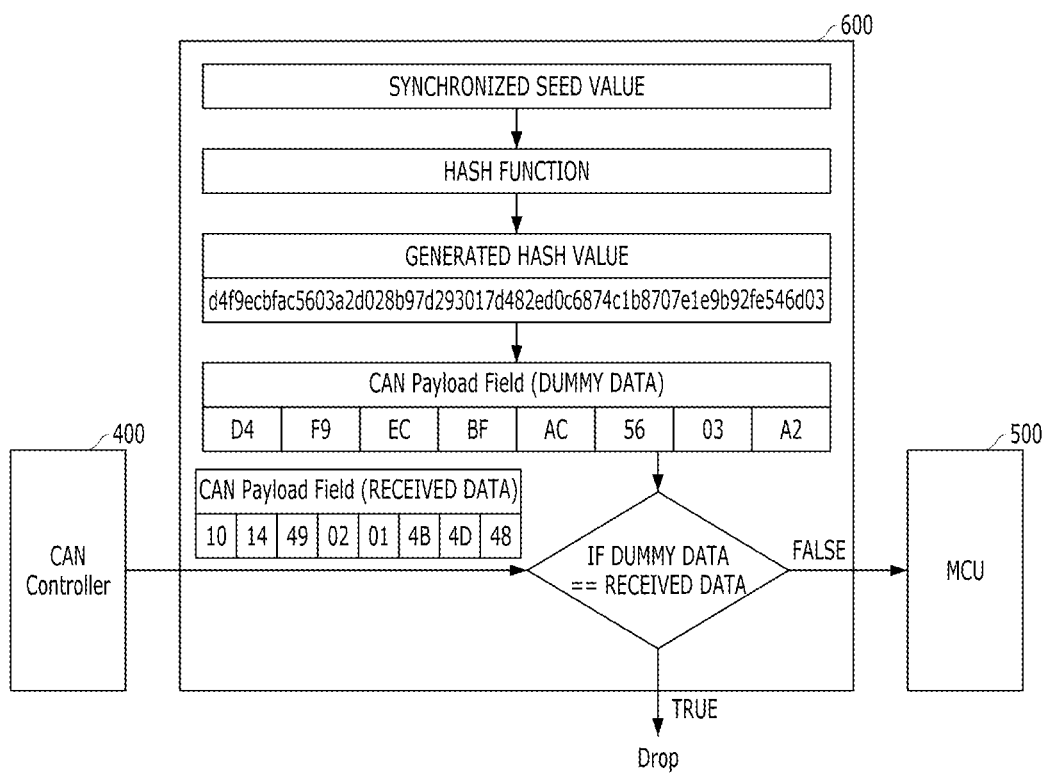

[FIG. 7]
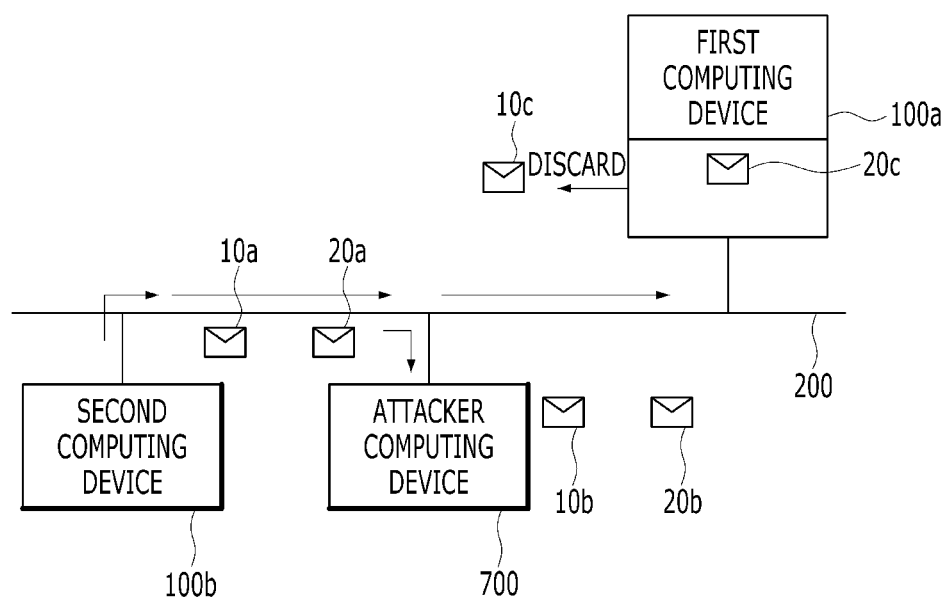

[FIG. 8]
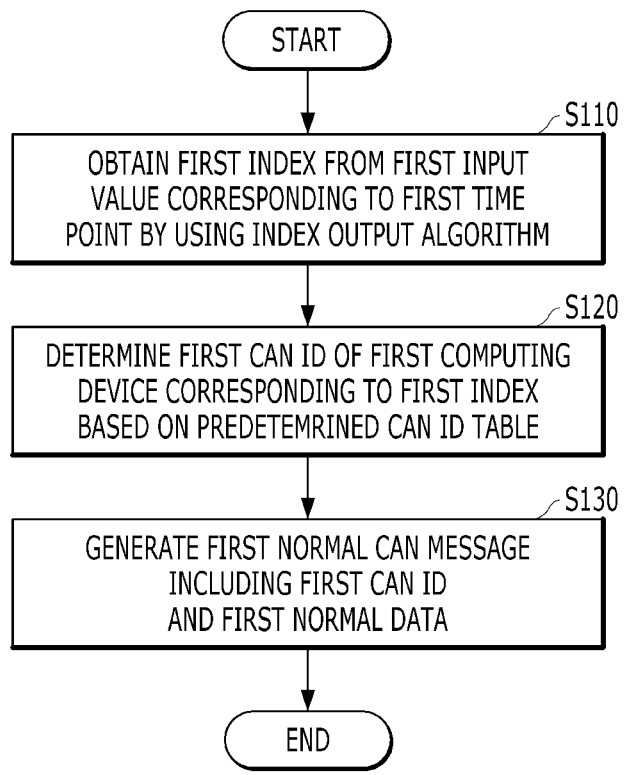

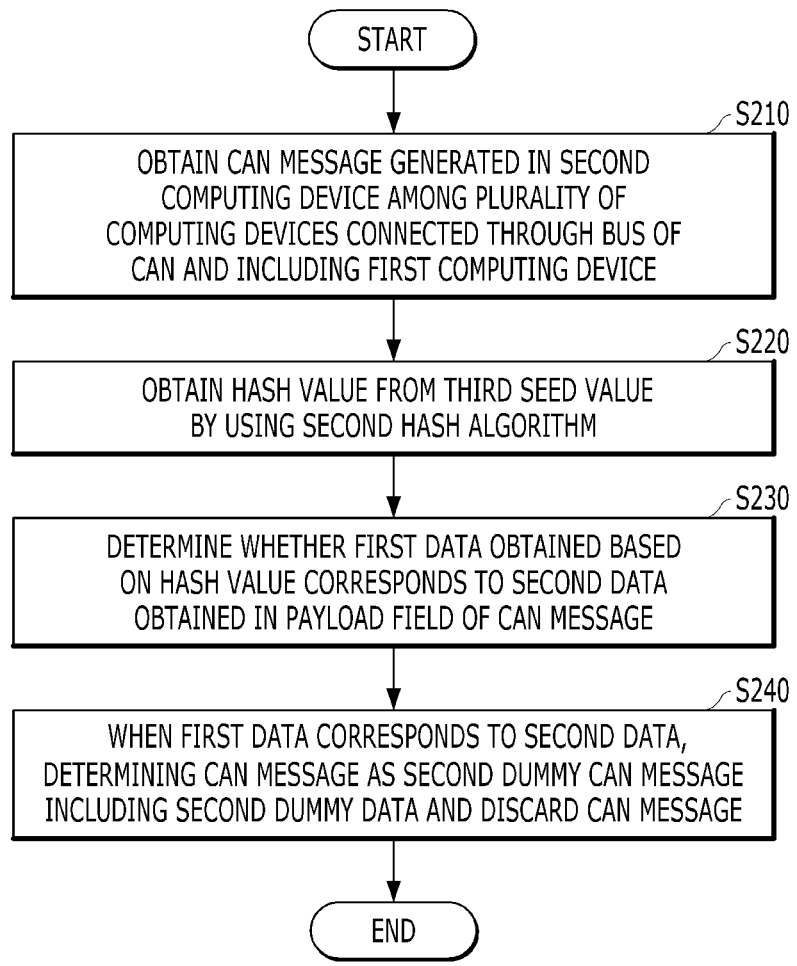
[FIG. 9]

[FIG. 10]
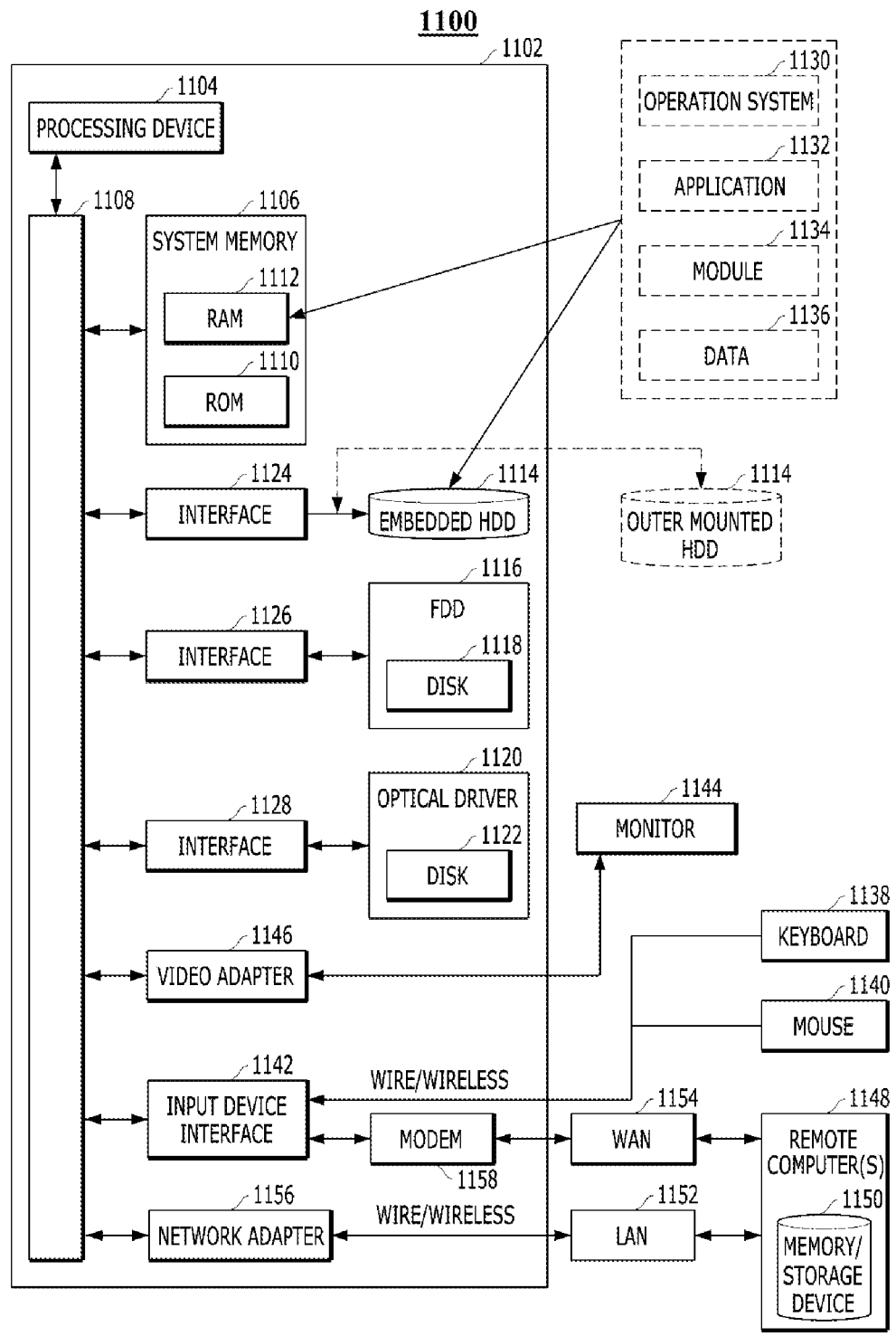

OBFUSCATION METHOD FOR CONTROLLER AREA NETWORK MESSAGE

CROSS-REFERENCE TO RELATED APPLICATIONS

This application claims priority to and the benefit of Korean Patent Application No. 10-2022-0116348 filed in the Korean Intellectual Property Office on Sep. 15, 2022, the entire contents of which are incorporated herein by reference.

TECHNICAL FIELD

The present disclosure relates to a method of obfuscating a Controller Area Network (CAN) message, and more particularly, to a method of obfuscating a CAN message by using a CAN ID and dummy data.

BACKGROUND ART

A Controller Area Network (CAN) is a communication standard developed in 1983 and is currently used for most internal vehicle communications, and is also used for internal communications in various Cyber Physical Systems (CPSs) based on its reliability and low cost.

Vehicles are moving away from personal transportation to intelligent transportation means, where vehicles are connected to vehicles, vehicles are connected to transportation systems, and vehicles are connected to everything. In addition, the number of Electronic Control Units (ECUs) mounted inside a vehicle may increase as the vehicle becomes more functional. This has led to a growing number of cyberattacks targeting vehicles.

It is characterized that CAN has high communication speed, which enables real-time message communication, and CAN messages are prioritized and processed according to their priority. However, due to the nature of the CAN communication protocol, it does not provide CAN message authentication or ECU authentication functions. Therefore, it is difficult to prove that a CAN message is a normal message generated from an authorized ECU.

Data transmission in the CAN communication occurs on a frame-by-frame basis. In this case, every frame has an Arbitration ID, which is a unique ID, that is, a CAN ID. In addition, the data that must be transmitted may be included in a payload field of the CAN message. The CAN message transmitted in this way may be identified by a fixed CAN ID. A value of the payload field of the CAN message is properly interpreted by the identified CAN ID.

The relevance and meaning of the CAN ID and the value of the payload field may vary for each vehicle manufacturing company, and there may be a Database CAN (DBC) file, which is a database file that organizes the contents of the relevance and meaning. Manufacturing companies are keeping DBC files as private as possible to protect the confidentiality of the data inside the vehicle. A DBC file is required to fully interpret the contents of a CAN message. However, due to the sophistication of hacking, an attacker with malicious intent may monitor normal packets existing on the CAN bus. It is possible to infer what a CAN message is about through certain periodicity for each CAN ID, the rate of change of the CAN payload, and the like. Therefore, even though the vehicle manufacturing company does not release the DBC file in the future, the fixed CAN ID and payload may still be cyber-attacked by an attacker.

PRIOR ART LITERATURE

Patent Document (Patent Document 1) Korean Patent No. 10-2269220 (Jun. 21, 2021)

SUMMARY OF THE INVENTION

The present disclosure has been conceived to provide a method of obfuscating a Controller Area Network (CAN) message by using a CAN ID and dummy data.

The technical objects of the present disclosure are not limited to the foregoing technical objects, and other non-mentioned technical objects will be clearly understood by those skilled in the art from the description below.

An exemplary embodiment of the present disclosure provides a method of obfuscating a Controller Area Network (CAN) message performed by a first computing device including a processor, the method including: obtaining a first index from a first input value corresponding to a first time point by using an index output algorithm; determining a first CAN ID of the first computing device corresponding to the first index based on a predetermined CAN ID table; and generating a first normal CAN message including the first CAN ID and first normal data.

Alternatively, the method may further include: at a second time point different from the first time point, obtaining a second index from a second input value including a second seed value corresponding to the second time point by using the index output algorithm; determining a second CAN ID of the first computing device corresponding to the second index based on the predetermined CAN ID table; and generating a second normal CAN message including the second CAN ID and second normal data.

Alternatively, the second time point may be shared in advance by a plurality of computing devices that is connected to each other through a bus of CAN and include the first computing device.

Alternatively, the index output algorithm may include at least one of a modular arithmetic algorithm and a first hash algorithm capable of outputting N to M integer indices, and N and M may be integers.

Alternatively, the index output algorithm, the predetermined CAN ID table, and the first time point may be shared in advance a plurality of computing devices connected to each other through a bus of CAN and including the first computing device.

Alternatively, the first input value includes a first seed value including a first time value corresponding to the first time point.

Alternatively, the method may further include, after the generating of the first normal CAN message including the first CAN ID and the first normal data, generating a first dummy CAN message including the first CAN ID and first dummy data that is different from the first normal data.

Alternatively, the generating of the first dummy CAN message may include: obtaining a hash value from a third seed value by using a second hash algorithm; generating the first dummy data that is input in a payload field of the first dummy CAN message based on the hash value; and generating the first dummy CAN message including the first CAN ID and the first dummy data, and the second hash algorithm and the third seed value may be shared in advance by a plurality of computing devices connected to each other through a bus of CAN and including the first computing device.

Alternatively, the method may further include, after the generating of the first dummy CAN message, transmitting the first normal CAN message and the first dummy CAN message to the plurality of computing devices connected through a bus of the CAN.

Alternatively, the method may further include: obtaining a CAN message generated by a second computing device of a plurality of computing devices connected to each other through a bus of CAN and including the first computing device; obtaining a hash value from a third seed value by using a second hash algorithm; determining whether first data obtained based on the hash value corresponds to second data obtained from a payload field of the CAN message; and when the first data corresponds to the second data, determining the CAN message as a second dummy CAN message including second dummy data and deleting the CAN message, and the second hash algorithm and the third seed value are shared in advance by the plurality of computing devices including the first computing device and the second computing device.

Alternatively, the method may further include when the first data does not correspond to the second data, determining the CAN message as a third normal CAN message including third normal data.

Another exemplary embodiment of the present disclosure provides a computer program stored in a computer-readable storage medium, the computer program including operations to cause a processor of a first computing device for performing obfuscation of a Controller Area Network (CAN) message to perform following operations, the operation including: obtaining a first index from a first input value corresponding to a first time point by using an index output algorithm; determining a first CAN ID of the first computing device corresponding to the first index based on a predetermined CAN ID table; and generating a first normal CAN message including the first CAN ID and first normal data.

Still another exemplary embodiment of the present disclosure provides a first computing device for obfuscating a Controller Area Network (CAN) message, the first computing device including: a processor including at least one core; a memory for storing a computer program executable by the processor; and a network unit, in which the processor obtains a first index from a first input value corresponding to a first time point by using an index output algorithm, determines a first CAN ID of the first computing device corresponding to the first index based on a predetermined CAN ID table, and generates a first normal CAN message including the first CAN ID and first normal data.

The present disclosure may obfuscating a CAN message by using a CAN ID and dummy data.

The effects of the present disclosure are not limited to the foregoing effects, and other non-mentioned effects will be clearly understood by those skilled in the art from the description below.

BRIEF DESCRIPTION OF THE DRAWINGS

Various aspects are described with reference to the drawings, and herein, like reference numerals are generally used to designate like constituent elements. In the exemplary embodiment below, for the purpose of description, a plurality of specific and detailed matters is suggested in order to provide general understanding of one or more aspects. However, it is apparent that the aspect(s) may be carried out without the specific and detailed matters.

FIG. 1 is a block diagram of a system for providing a method of obfuscating a Controller Area Network (CAN) message used in a CAN according to some embodiments of the present disclosure.

FIG. 2 is a diagram for illustrating a configuration of a CAN message according to some exemplary embodiments of the present disclosure.

FIG. 3 is a diagram for illustrating a CAN ID table according to some exemplary embodiments of the present disclosure.

FIG. 4 is a block diagram for illustrating a processor of a first computing device according to some exemplary embodiments of the present disclosure.

FIG. 5 is a diagram for illustrating a method of generating dummy data in the processor of the first computing device according to some embodiments of the present disclosure.

FIG. 6 is a diagram for illustrating a method for reading dummy data from the processor of the first computing device according to some embodiments of the present disclosure.

FIG. 7 is a diagram for illustrating a movement process of a CAN message used in the CAN according to some embodiments of the present disclosure.

FIGS. 8 and 9 are flowcharts for illustrating a method of obfuscating a CAN message performed by the first computing device including the processor according to some embodiments of the present disclosure.

FIG. 10 is a brief, general, and schematic diagram for illustrating an example of a computing environment in which the embodiments of the present disclosure may be implemented.

DETAILED DESCRIPTION

Various exemplary embodiments are described with reference to the drawings. In the present specification, various descriptions are presented for understanding the present disclosure. However, it is obvious that the exemplary embodiments may be carried out even without a particular description.

Terms, "component", "module", "system", and the like used in the present specification indicate a computer-related entity, hardware, firmware, software, a combination of software and hardware, or execution of software. For example, a component may be a procedure executed in a processor, a processor, an object, an execution thread, a program, and/or a computer, but is not limited thereto. For example, both an application executed in a computing device and a computing device may be components. One or more components may reside within a processor and/or an execution thread. One component may be localized within one computer. One component may be distributed between two or more computers. Further, the components may be executed by various computer readable media having various data structures stored therein. For example, components may communicate through local and/or remote processing according to a signal (for example, data transmitted to another system through a network, such as the Internet, through data and/or a signal from one component interacting with another component in a local system and a distributed system) having one or more data packets.

A term "or" intends to mean comprehensive "or", not exclusive "or". That is, unless otherwise specified or when it is unclear in context, "X uses A or B" intends to mean one of the natural comprehensive substitutions. That is, in the case where X uses A; X uses B; or, X uses both A and B, "X uses A or B" may apply to either of these cases. Further, a term "and/or" used in the present specification shall be understood to designate and include all of the possible combinations of one or more items among the listed relevant items.

A term "include" and/or "including" shall be understood as meaning that a corresponding characteristic and/or a constituent element exists. Further, it shall be understood that a term "include" and/or "including" means that the existence or an addition of one or more other characteristics, constituent elements, and/or a group thereof is not excluded. Further, unless otherwise specified or when it is unclear that a single form is indicated in context, the singular shall be construed to generally mean "one or more" in the present specification and the claims.

The term "at least one of A and B" should be interpreted to mean "the case including only A", "the case including only B", and "the case where A and B are combined".

Those skilled in the art shall recognize that the various illustrative logical blocks, configurations, modules, circuits, means, logic, and algorithm operations described in relation to the exemplary embodiments additionally disclosed herein may be implemented by electronic hardware, computer software, or in a combination of electronic hardware and computer software. In order to clearly exemplify interchangeability of hardware and software, the various illustrative components, blocks, configurations, means, logic, modules, circuits, and operations have been generally described above in the functional aspects thereof. Whether the functionality is implemented as hardware or software depends on a specific application or design restraints given to the general system. Those skilled in the art may implement the functionality described by various methods for each of the specific applications. However, it shall not be construed that the determinations of the implementation departs from the range of the contents of the present disclosure.

The description about the presented exemplary embodiments is provided so as for those skilled in the art to use or carry out the present disclosure. Various modifications of the exemplary embodiments will be apparent to those skilled in the art. General principles defined herein may be applied to other exemplary embodiments without departing from the scope of the present disclosure. Therefore, the present disclosure is not limited to the exemplary embodiments presented herein. The present disclosure shall be interpreted within the broadest meaning range consistent to the principles and new characteristics presented herein.

In the present disclosure, terms expressed as an $N^{th}$, such as a first, a second, or a third, are used to distinguish a plurality of entities. For example, the entities expressed by a first and a second may be the same as or different from each other. The terms expressed with a first-1 and a first-2, and the terms expressed with a second-1 and a second-2 may also be used to distinguish multiple entities from each other.

FIG. 1 is a block diagram of a system for providing a method of obfuscating a Controller Area Network (CAN) message used in a CAN according to some embodiments of the present disclosure.

The configuration of the system illustrated in FIG. 1 is only a simplified example. In one exemplary embodiment of the present disclosure, the system may include other components, and only some of the disclosed components may constitute the system.

Referring to FIG. 1, the system may include a first computing device 100a, a second computing device 100b, a third computing device 100c, . . . , an $N^{th}$ computing device 100N, and a bus 200. Herein, N is a natural number.

The first computing device 100a may include a processor 110, a memory 130, and a network unit 150.

The processor 110 may be formed of one or more cores, and may include a processor, such as a central processing unit (CPU), a general purpose graphics processing unit (GPGPU), and a tensor processing unit (TPU) of the computing device, for obfuscating a CAN message.

According to the some exemplary embodiments of the present disclosure, the memory 130 may store a predetermined type of information generated or determined by the processor 110 and a predetermined type of information received by a network unit 150. For example, the memory 130 may store information, data, and the like that has been previously shared by other computing devices (for example, the second computing device 100b to the $N^{th}$ computing device) connected through the bus 200, such as an index output algorithm to be described later, a predetermined CAN ID table, a specific time point, and a seed value.

According to the some exemplary embodiments of the present disclosure, the memory 130 may include at least one type of storage medium among a flash memory type, a hard disk type, a multimedia card micro type, a card type of memory (for example, an SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk. The first computing device 100a may also be operated in relation to web storage performing a storage function of the memory 130 on the Internet. The description of the foregoing memory is merely illustrative, and the present disclosure is not limited thereto.

The network unit 150 according to some exemplary embodiments of the present disclosure may include any wired or wireless communication network capable of transmitting and receiving any form of data, signals, and the like.

The technologies described in the present specification may be used in other networks, as well as the foregoing networks.

The first computing device 100a according to some embodiments of the present disclosure may be a device for performing obfuscation of CAN messages. For example, the first computing device 100a may be a device for performing obfuscation of a CAN message by using a CAN ID and/or dummy data.

CAN may be a communication standard developed to perform communications, including transmission and reception of data between the systems connected through the bus 200.

The structure of the CAN may have a structure in which the computing devices (for example, vehicle safety systems, or vehicle comfort systems) that configure a particular system (for example, vehicle system, automation equipment system, or medical equipment system) are connected through the bus 200.

In the CAN, the computing devices may operate in a multi-master fashion, where each computing device is connected in parallel as a master and is capable of accessing data transmitted and received from all computing devices.

In the CAN, the bus 200 may refer to a commonly used electrical pathway when the computing devices transfer data to each other.

A CAN message is a message that occurs in the CAN and may be a message generated by each of the systems involved in the CAN to transfer data. A CAN message may include an arbitration field and a payload field. The arbitration field may include an arbitration ID. The arbitration ID may consist of 11 bits or 29 bits and may be an identifier of a CAN message. Further, the Arbitration ID may also be a CAN ID assigned to a specific computing device. The payload field may consist of 0 to 64 bits and include the payload, which is the value of the transmitted actual data. A payload may include information to be transmitted from a specific computing device to another computing device. The information may be interpreted based on a Database CAN (DBC) file. A Database CAN (DBC) file may be a database file that includes an arbitration ID and information about the meaning and function of each payload field corresponding to the Arbitration ID. Thus, the processor 110 may interpret the payload described in the payload field through the DBC file to obtain the information to be transmitted from a specific computing device to another computing device. A more detailed description of the CAN message will be provided later with reference to FIG. 2.

The processor 110 may obtain a first index from a first input value corresponding to a first time point by using an index output algorithm.

The index output algorithm may include at least one of a modular arithmetic algorithm and a first hash algorithm capable of outputting N to M integer indices. Herein, N and M may be integers.

A modular arithmetic algorithm may mean an algorithm that performs a division on two numbers to produce a remainder. For example, the processor 110 may perform an operation using a modular arithmetic algorithm to divide "100" by "12" to yield "4".

A first hash algorithm may refer to a set of mathematically expressed rules for converting long length data into short length data. For example, the first hash algorithm may include a Secure Hash Algorithm (SHA) (for example, SHA-256, or SHA-512). However, the first hash algorithm described above is only an example and may include various forms of hash algorithms.

SHA may refer to a collection of hash functions. A hash function may be a function that takes in a value of arbitrary length and outputs a fixed-length hash value. Thus, when the processor 110 inputs the first input value to the SHA included in the first hash algorithm, an output value (for example, the first index) of a predetermined length (for example, 160 bits to 512 bits) may be output. That is, the processor 110 may obtain the first index from the first input value corresponding to the first time point by using the SHA included in the first hash algorithm.

The index output algorithm may be shared in advance across a plurality of computing devices (for example, the first computing device 100*a* to the N$^{th}$ computing device 100N) including the first computing device 100*a*. The plurality of computing devices (for example, the first computing device 100*a* to the N$^{th}$ computing device 100N) may be connected to each other through the bus 200 of the CAN.

The first time point may mean any moment in time. The first time point may be shared in advance across the plurality of computing devices (for example, the first computing device 100*a* to the N$^{th}$ computing device 100N) including the first computing device 100*a*. The plurality of computing devices may be connected to each other through the bus 200 of the CAN.

The first input value may include a first seed value including a first time value corresponding to the first time point.

The first seed value may include at least one of a synchronized first time value and/or first key value corresponding to the first time point. Synchronization may refer to being shared in advance between the plurality of computing devices (for example, the first computing device 100*a* to the N$^{th}$ computing device 100N) connected through the bus 200 of the CAN. The synchronized first time value may be a specific predetermined time. For example, the synchronized first time value may be a time value at the time of vehicle startup, when the plurality of computing devices is included in the vehicle. The synchronized first key value may be a value consisting of a specific character string.

The first index may be a value obtained by transforming the first input value through the index output algorithm. The first index may be the value output from the index output algorithm by inputting the first input value to the index output algorithm. The first index may be represented as an integer.

Based on a predetermined CAN ID table, the processor 110 may determine a first CAN ID of the first computing device corresponding to the first index.

The predetermined CAN ID table may be a table in which the CAN ID of each of the plurality of computing devices (for example, the first computing device 100*a* to the N$^{th}$ computing device 100N) is listed differently according to the value of an index. A specific description of the predetermined CAN ID table will be described later with reference to FIG. 3.

The predetermined CAN ID table may be shared in advance across the plurality of computing devices (for example, the first computing device 100*a* to the N$^{th}$ computing device 100N) including the first computing device 100*a*. The plurality of computing devices (for example, the first computing device 100*a* to the N$^{th}$ computing device 100N) may be connected to each other through the bus 200 of the CAN.

The processor 110 may generate a first normal CAN message that includes a first CAN ID and first normal data. The first normal data may include data that the processor 110 wishes to transmit to another computing device (for example, at least one of the second computing device 100*b* to the N$^{th}$ computing device 100N) that is different from the first computing device 100*a* at the first time point. Thus, the first normal data may mean real data, not randomly generated dummy data.

At a second time point different from the first time point, the processor 110 may obtain a second index from a second input value corresponding to a second time point by using the index output algorithm.

The second time point may be a predetermined time interval from the first time point. The second time point may be shared in advance across the plurality of computing devices (for example, the first computing device 100*a* to the N$^{th}$ computing device 100N) including the first computing device 100*a*. The plurality of computing devices may be connected to each other through the bus 200 of the CAN. The predetermined time interval may be determined based on the level of security, amount of data processing, and the like. For example, it is desired to increase the level of security, the predetermined time interval may be set to 1 second, 2 seconds, and the like, which is shorter than the existing time interval (for example, 10 seconds).

The second input value may include a second seed value including a second time value corresponding to the second time point.

The second seed value may include at least one of a synchronized second time value and/or second key value corresponding to the second time point. Synchronization may refer to being shared in advance between the plurality of computing devices (for example, the first computing device 100*a* to the N$^{th}$ computing device 100N) connected through the bus 200 of the CAN. The synchronized second time value may be a specific time with a predetermined time interval from the first time value. The synchronized second key value may be a value consisting of a specific character string. The second key value may be a value consisting of a character string different from that of the first key value.

The second index may be a value obtained by transforming the second input value through the index output algorithm. The second index may be the value output from the index output algorithm by inputting the second input value to the index output algorithm. The second index may be represented as an integer.

Based on a predetermined CAN ID table, the processor 110 may determine a second CAN ID of the first computing device 100*a* corresponding to the second index.

The second index may be a value corresponding to the first index or a value different from the first index. Thus, the second CAN ID may be a value corresponding to the first CAN ID or a value different from the first CAN ID.

The processor 110 may generate a second normal CAN message that includes a second CAN ID and second normal data. The second normal data may include data that the processor 110 wishes to transmit to another computing device (for example, at least one of the second computing device 100*b* to the N$^{th}$ computing device 100N) that is different from the first computing device at the second time point. Thus, the second normal data may mean real data, not randomly generated dummy data.

The processor 110 may generate a first dummy CAN message that includes the first CAN ID and first dummy data that is different from the first normal data.

For example, after generating the first normal CAN message that includes the first CAN ID and the first normal data, the processor 110 may generate a first dummy CAN message that includes the first CAN ID and first dummy data that is different from the first normal data.

Specifically, the processor 110 may obtain a hash value from a third seed value by using a second hash algorithm.

The second hash algorithm may be a different algorithm from the first hash algorithm. A second hash algorithm may refer to a set of mathematically expressed rules for converting long length data into short length data. For example, the second hash algorithm may include a Secure Hash Algorithm (SHA) (for example, SHA-256, or SHA-512). However, the second hash algorithm described above is only an example and may include various forms of hash algorithms.

SHA may refer to a collection of hash functions. A hash function may be a function that takes in a value of arbitrary length and outputs a fixed-length hash value. Thus, when the processor 110 inputs the third seed value to the SHA included in the second hash algorithm, an output value (for example, the hash value) of a predetermined length (for example, 160 bits to 512 bits) may be output. That is, the processor 110 may obtain the hash value from the third seed value by using the SHA included in the second hash algorithm.

The second hash algorithm may be shared in advance across the plurality of computing devices (for example, the first computing device 100*a* to the N$^{th}$ computing device 100N) including the first computing device 100*a*. The plurality of computing devices (for example, the first computing device 100*a* to the N$^{th}$ computing device 100N) may be connected to each other through the bus 200 of the CAN.

The third seed value may include at least one of a synchronized third time value and/or third key value. Synchronization may refer to being shared in advance between the plurality of computing devices (for example, the first computing device 100*a* to the N$^{th}$ computing device 100N) connected through the bus 200 of the CAN. The synchronized third time value may be a specific predetermined time. For example, the synchronized third time value may be a time value at the time of vehicle startup, when the plurality of computing devices is included in the vehicle. The synchronized third key value may be a value consisting of a specific character string.

The third seed value may be shared in advance across the plurality of computing devices (for example, the first computing device 100*a* to the N$^{th}$ computing device 100N) including the first computing device 100*a*. The plurality of computing devices (for example, the first computing device 100*a* to the N$^{th}$ computing device 100N) may be connected to each other through the bus 200 of the CAN.

The hash value may be a value obtained by transforming the third seed value through the second hash algorithm. The hash value may be the value output from the second hash algorithm by inputting the third seed value into the second hash algorithm.

Based on the hash value, the processor 110 may generate first dummy data that is input to a payload field of the first dummy CAN message. For example, the processor 110 may determine a bit range of the first dummy data to correspond to a bit range of the first normal data included in the first normal message. The processor 110 may generate at least a portion of the hash value as the first dummy data to correspond to the determined bit range of the first dummy data. When the hash value is less than the bit range of the first dummy data, the processor 110 may generate a duplicate hash value obtained by duplicating the hash value. The processor 110 may generate the hash value and the duplicate hash value as the first dummy data to correspond to the bit range of the first dummy data. If the hash value is greater than the bit range of the first dummy data, the processor 110 may generate a portion of the hash value as the first dummy data to correspond to the bit range of the first dummy data.

The processor 110 may generate the first dummy CAN message that includes the first CAN ID and the first CAN dummy data.

The processor 110 may transmit the first normal CAN message and the first dummy CAN message to the plurality of computing devices (for example, the second computing device 100*b* to the N$^{th}$ computing device 100N) connected through the bus 200 of the CAN.

In the meantime, according to some embodiments of the present disclosure, the processor 110 may obtain the CAN message generated by the second computing device 100*b* among the plurality of computing devices connected to each other through the bus 200 of the CAN and including the first computing device 100*a*. Here, a CAN message may be a normal CAN message including normal data or a dummy CAN message including dummy data.

The processor 110 may obtain a hash value from the third seed value by using the second hash algorithm.

The processor 110 may determine whether the first data obtained based on the hash value corresponds to the second data obtained in the payload field of the CAN message.

When the first data and the second data correspond to each other, the processor 110 may determine the CAN message to be a second dummy CAN message including the second dummy data and discard the CAN message.

When the first data and the second data correspond to each other, the second data may be second dummy data because the second data was generated based on the hash value.

The second dummy data may be data different from the normal data. The second dummy data may be data generated based on a hash value. Because the second dummy data was generated based on the same hash value as the first dummy data, the second dummy data may correspond to the value of the first dummy data.

When the first data and the second data do not correspond, the processor 110 may determine the CAN message to be a third normal CAN message including third normal data.

When the first data and the second data do not correspond, the second data may be third normal data because the second data was not generated based on the hash value.

The third normal data may include data that the second computing device 100b wishes to transmit to another computing device (for example, at least one of the first computing device 100a, and the third computing device 100c to the $N^{th}$ computing device 100N) that is different from the second computing device 100b. Thus, the third normal data may mean real data, not randomly generated dummy data.

On the other hand, the second computing device 100b, the third computing device 100c, . . . , the $N^{th}$ computing device 100N, and the like may refer to any form of computing device in the system having a mechanism for communicating with the first computing device 100a. For example, the plurality of computing devices may be devices that include an electronic control unit (ECU). The plurality of computing devices 200 may operate in a multi-master fashion, where each computing device is connected in parallel as a master and is capable of accessing data transmitted and received from all computing devices. The second computing device 100b, the third computing device 100c, . . . , the $N^{th}$ computing device 100N, and the like may each generate a CAN message, and may be connected to the bus 200 to transmit the CAN message to other computing devices through the bus 200.

The second computing device 100b, the third computing device 100c, . . . , and the $N^{th}$ computing device 100N may each include a processor, a memory, and a network unit. Herein, N is a natural number.

The processor may be formed of one or more cores, and may include a processor, such as a central processing unit (CPU), a general purpose graphics processing unit (GPGPU), and a tensor processing unit (TPU) of the computing device, for obfuscating a CAN message.

According to some embodiments of the present disclosure, the memory may store any form of information generated or determined by the processor and any form of information received by the network unit.

The network unit according to some embodiments of the disclosure may include any wired or wireless communication network capable of transmitting and receiving any form of data and signals.

As for the second computing device 100b, the third computing device 100c, . . . , and the $N^{th}$ computing device 100N, the specific description of each may be replaced by the specific description of the first computing device 100a described above.

In one aspect, the bus 200 may refer to an electrical pathway that is used in common by the plurality of computing devices (for example, the first computing device 100a, the second computing device 100b, the third computing device 100c, . . . , and the $N^{th}$ computing device 100N) to transmit data to each other. For example, the bus 200 may be a pathway through which CAN messages generated by the plurality of computing devices are traveled. The bus 200 may include a plurality of communication lines, and may perform communication by using the plurality of communication lines. For example, the bus 200 may perform communication through a voltage difference between two communication lines of a CAN High (or CAN Hi or CAN-H) and a CAN Low (or CAN Lo or CAN-L). The plurality of computing devices (for example, the first computing device 100a to the $N^{th}$ computing device 100N) may perform communication through the bus 200 by interpreting a 0 bit or a 1 bit based on a voltage difference between two communication lines (for example, CAN High and CAN Low).

FIG. 2 is a diagram for illustrating a configuration of a CAN message according to some exemplary embodiments of the present disclosure.

Referring to FIG. 2, a CAN message may be a concatenation of the plurality of divided fields. The plurality of fields may include at least one of a Start Of Frame (SOF) field, an arbitration field, a control field, a payload field, a Cyclic Redundancy Check (CRC) field, an Acknowledgment (ACK) field, an End Of Frame (EOF) field, and/or an Intermission (ITM) field. However, the above-described components are not essential for implementing the CAN message, and the CAN message may have more or fewer components than the components listed above.

The SOF field may consist of 1 bit and may indicate the start of a CAN message. Thus, the SOF field may synchronize all computing devices connected to the bus by notifying all computing devices connected to the bus that message transmission has begun.

The arbitration field may include an arbitration ID and a Remote Transmission Request (RTR).

The arbitration ID may consist of 11 bits or 29 bits and may be an identifier of a CAN message. The arbitration ID may be a value for determining priority. For example, a CAN message may have higher priority as the arbitration ID value is smaller. However, the CAN message is not limited thereto, and may also have higher priority as the arbitration ID value is greater.

The RTR consists of 1 bit, and when a first CAN message, which is a data frame, and a second CAN message, which is a remote frame, transmitted simultaneously have the same arbitration ID, the RTR may be a value for determining priority. The data frame may refer to a structure including a payload field. The remote frame may mean a structure that does not include a payload field. For example, when the value of the RTR is '0', the corresponding CAN message may be recognized as a data frame. When the value of RTR is '1', the corresponding CAN message may be recognized as a remote frame.

Therefore, it is possible to recognize the first CAN message as a priority by determining the case in which the value of RTR is '0' as the priority between the first CAN message and the second CAN message transmitted at the same time.

The control field may include Identifier Extension (IDE), reserved, and a Data Length Code (DLC).

The IDE consists of 1 bit, and may be a value for distinguishing a standard CAN message and an extended CAN message, which are types of corresponding CAN messages. A standard CAN message may be a CAN message having an arbitration ID of 11 bits. The extended CAN message may be a message having an arbitration ID of 29 bits. For example, when the value of IDE is 0, the message may be determined as a standard CAN message. Further, when the value of IDE is 1, the message may be determined as an extended CAN message.

The Reserved consists of two 1 bits (for example, r0 and r1), and may be a value used when an arbitration ID is later extended (for example, 29 bits). For example, the Reserved may be used to extend an arbitration ID to correspond to other communication networks when the Reserved is used in a communication network other than the CAN.

The DLC consists of 4 bits, and may be a value indicating the length of data included in the payload field.

The payload field may consist of 0 to 64 bits and include the payload, which is the value of the transmitted actual data. A payload may include information to be transmitted from a specific computing device to another computing device. Here, the information may be interpreted based on the Database CAN (DBC) file. A Database CAN (DBC) file may be a database file that includes an arbitration ID and information about the meaning and function of each payload field corresponding to the Arbitration ID. The DBC file may include at least one of the following: a signal name, a start bit for the signal, a bit length used, an increment, a range of values, and/or information about the affecting function. For example, the signal name might be a speed of the front left wheel. The start bit of the signal may be zero. The bit length used may be 8. The increment may be 0.0625. The range of the value may be from 0 to 255. An affecting function may be smart cruise control. Thus, the processor 110 may interpret the payload described in the payload field through the DBC file to obtain the information to be transmitted from a specific computing device to another computing device.

The CRC field may include a Cyclic Redundancy Check sequence (CRC sequence) and a Cyclic Redundancy Check delimiter (CRC delimiter).

The CRC sequence consists of 15 bits and may be a value calculated by the transmitting computing device based on a specific algorithm. Therefore, a receiving computing device may determine whether a bit error exists in the CAN message by calculating the value of the CRC sequence based on the specific algorithm described above.

The CRC delimiter consists of 1 bit, and may indicate the end of the CRC field.

The ACK field may include an acknowledgment slot (ACK slot) and an acknowledgment delimiter (ACK delimiter).

The ACK slot consists of 1 bit, and may be a value for determining whether normal reception of the CAN message has been completed. For example, when it is determined that the CRC sequence is normal as a result of the check of the CRC sequence, the ACK slot may include a value of '0'. Further, when it is determined that the CRC sequence is abnormal as a result of the check of the CRC sequence, the ACK slot may include a value of '1'.

The ACK delimiter consists of 1 bit, and may indicate the end of an ACK field.

The frame end field consists of 7 bits, and may indicate the end of the frame of the CAN message. For example, the frame end field may consist of '1111111', which is 7 bits.

The intermission field consists of 3 bits and may be a buffer area to facilitate the transmission and reception of CAN messages between the computing devices.

FIG. 3 is a diagram for illustrating a CAN ID table according to some exemplary embodiments of the present disclosure.

Referring to FIG. 3, the CAN ID table may be a table in which the CAN ID of each of the plurality of computing devices (for example, the first computing device 100a to the N$^{th}$ computing device 100N) is listed differently according to the value of an index. For example, the first computing device 100a may predetermine that the CAN ID is 0x110 when the value of the index is 1, that the CAN ID is 0x115 when the value of the index is 2, and that the CAN ID is 0x11c when the value of the index is N.

The CAN ID table may be shared in advance across the plurality of computing devices (for example, the first computing device 100a to the N$^{th}$ computing device 100N) including the first computing device 100a. The plurality of computing devices (for example, the first computing device 100a to the N$^{th}$ computing device 100N) may be connected to each other through the bus 200 of the CAN. Thus, the plurality of computing devices may identify the computing device that generated the obtained CAN message through the shared CAN ID table. For example, the first computing device 100a may determine that the obtained CAN message was generated by the second computing device when the CAN ID of the obtained CAN message is 0x7ae and the index based on the current shared time point is 1.

The plurality of computing devices (for example, the first computing device 100a to the N$^{th}$ computing device 100N) may obtain an index based on the shared time point, and determine a CAN ID based on the predetermined CAN ID table and the obtained index. Thus, an attacker computing device that does not have the shared time point and CAN ID table may not be able to interpret CAN messages obtained without permission through the bus 200, and fail the attack.

FIG. 4 is a block diagram for illustrating a processor of the first computing device according to some exemplary embodiments of the present disclosure.

Referring to FIG. 4, the processor 110 of the first computing device 100a may include a CAN transceiver 300, a CAN controller 400, a microcontroller unit (MCU) 500, and the like. However, the components described above are not essential to implement the processor 110, and the processor 110 may have more or fewer components than those listed above. Further, the processor 110 may implement the above-described configurations in software.

The CAN transceiver 300 may obtain at least one CAN message (for example, a first CAN message, and a second CAN message) generated from the CAN. For example, the CAN transceiver 300 may collect at least one CAN message by sniffing traffic generated in the bus 200 of the CAN. However, without limitation, the CAN transceiver 300 may obtain at least one CAN message through various methods other than the method described above.

The CAN transceiver 300 may transmit the CAN message generated by the first computing device 100a to other computing devices (for example, the second computing device 100b to the N$^{th}$ computing device). For example, the CAN transceiver 300 may transmit the CAN message generated by the first computing device 100a to other computing devices through the bus 200.

The CAN controller 400 may control the CAN transceiver 300. Thus, the CAN controller 400 may transmit or receive the CAN message through the CAN transceiver 300.

The MCU 500 may interpret the received CAN message through a pre-shared CAN ID table. The MCU 500 may generate data (for example, normal data) and generate a CAN message including the corresponding data.

FIG. 5 is a diagram for illustrating a method of generating dummy data in the processor of the first computing device according to some embodiments of the present disclosure.

Referring to FIG. 5, the processor 110 may include a dummy data generating unit 600.

The dummy data generating unit 600 may obtain a hash value from a seed value by using a hash algorithm.

Based on the hash value, the dummy data generating unit 600 may generate dummy data that is input into the payload field of the dummy CAN message. The dummy data generation unit 600 may determine a bit range of the dummy data to correspond to a bit range of the normal data included in the normal message generated by the MCU 500. Further, the dummy data generation unit 600 may generate at least a portion of the hash value as dummy data to correspond to the determined bit range of the dummy data.

The dummy data generation unit 600 may generate a dummy CAN message including the CAN ID and the dummy data contained in the normal CAN message and transmit the generated dummy CAN message to the CAN Controller 400.

The CAN Controller 400 may transmit the normal CAN message generated by the MCU 500 and the dummy CAN messages generated by the dummy data generation unit 600 to other computing devices (for example, the second computing device 100b to the N$^{th}$ computing device) through the CAN transceiver 300.

FIG. 6 is a diagram for illustrating a method for reading dummy data from the processor of the first computing device according to some embodiments of the present disclosure.

Referring to FIG. 6, the processor 110 may include the dummy data generation unit 600.

The dummy data generating unit 600 may obtain a hash value from a seed value by using a hash algorithm.

Based on the hash value, the dummy data generating unit 600 may generate dummy data that is input into the payload field of the dummy CAN message. The dummy data generation unit 600 may determine a bit range of the dummy data to correspond to a bit range of the normal data included in the normal message generated by the MCU 500. Further, the dummy data generation unit 600 may generate at least a portion of the hash value as dummy data to correspond to the determined bit range of the dummy data.

The dummy data generation unit 600 may determine whether the generated dummy data corresponds to the received data obtained from the payload field of the CAN message transmitted through the CAN controller 400.

When the generated dummy data corresponds to the received data obtained from the payload field of the CAN message transmitted through the CAN controller 400, the dummy data generation unit 600 may determine that the received data is dummy data and discard the transmitted CAN message.

When the generated dummy data does not correspond to the received data obtained from the payload field of the CAN message transmitted through the CAN controller 400, the dummy data generation unit 600 may determine that the received data is normal data, and may transmit the transmitted CAN message to the MCU 500.

FIG. 7 is a diagram for illustrating a movement process of a CAN message used in the CAN according to some embodiments of the present disclosure.

Referring to FIG. 7, the dummy CAN message 10a and the normal CAN message 20a generated by the second computing device 100b may be transmitted to the first computing device 100a and the attacker computing device 700 through the bus 200.

The attacker computing device 700 may illegally collect a dummy CAN message 10b and a normal CAN message 20b through the bus 200. However, the attacker computing device 700 is unable to interpret the collected dummy CAN message 10b and the normal CAN message 20b because the attacker computing device 700 does not have information, such as the CAN ID table, time point, seed value, index output algorithm, hash algorithm, and the like shared across the plurality of computing devices (for example, the first computing device 100a to the N$^{th}$ computing device 100N).

The first computing device 100a may interpret a dummy CAN message 10c and a normal CAN message 20c by using information of the pre-shared CAN ID table, time point, seed value, index output algorithm, hash algorithm, and the like. The first computing device 100a may then discard the dummy CAN message 10c and store the normal CAN message 20c.

FIGS. 8 and 9 are flowcharts for illustrating a method of obfuscating a CAN message performed by the first computing device including the processor according to some embodiments of the present disclosure.

Referring to FIG. 8, the processor 110 of the first computing device 100a may obtain a first index from a first input value corresponding to a first time point by using an index output algorithm (S110).

The index output algorithm may include at least one of a modular arithmetic algorithm and a first hash algorithm capable of outputting N to M integer indices, and N and M may be integers.

The first input value may include a first seed value including a first time value corresponding to the first time point.

Based on the predetermined CAN ID table, the processor 110 may determine a first CAN ID of the first computing device 100a corresponding to the first index (S120).

The processor 110 may generate a first normal CAN message including a first CAN ID and first normal data (S130).

The index output algorithm, the predetermined CAN ID table, and the first time point may be shared in advance across the plurality of computing devices (for example, the first computing device 100a to the N$^{th}$ computing device 100N) that are connected to each other through the bus 200 of the CAN and include the first computing device 100a.

At a second time point different from the first time point, the processor 110 may obtain a second index from a second input value including a second seed value corresponding to the second time point by using an index output algorithm.

The second time point may be shared in advance by the plurality of computing devices that are connected to each other through the bus of the CAN and include the first computing device.

Based on a predetermined CAN ID table, the processor 110 may determine a second CAN ID of the first computing device 100a corresponding to the second index.

The processor 110 may generate a second normal CAN message that includes a second CAN ID and second normal data.

After operation S130 of generating the first normal CAN message including the first CAN ID and the first normal data, the processor 110 may generate a first dummy CAN message including the first CAN ID and first dummy data that is different from the first normal data. Specifically, the processor 110 may obtain a hash value from a third seed value by using a second hash algorithm. Based on the hash value, the processor 110 may generate first dummy data that is input to a payload field of the first dummy CAN message. The processor 110 may generate the first dummy CAN message that includes the first CAN ID and the first CAN dummy data. The processor 110 may then transmit the first normal CAN message and the first dummy CAN message to the plurality of computing devices (for example, the second computing device 100b to the N$^{th}$ computing device 100N) connected through the bus of the CAN.

The second hash algorithm and the third seed value may be shared in advance by the plurality of computing devices (for example, the first computing device 100a to the $N^{th}$ computing device 100N) that are connected to each other through the bus 200 of the CAN and that include the first computing device 100a.

Referring to FIG. 9, the processor 110 may obtain a CAN message generated by the second computing device of the plurality of computing devices connected to each other through a bus of CAN and including the first computing device (S210).

The processor 110 may obtain a hash value from the third seed value by using the second hash algorithm (S220).

The processor 110 may determine whether the first data obtained based on the hash value corresponds to the second data obtained in the payload field of the CAN message (S230).

When the first data corresponds to the second data, the processor 110 may determine the CAN message to be a second dummy CAN message including the second dummy data and discard the CAN message (S240).

When the first data does not correspond to the second data, the processor 110 may determine the CAN message to be a third normal CAN message including third normal data.

The second hash algorithm and the third seed value may be shared in advance across the plurality of computing devices including the first computing device 100a and the second computing device 100b (for example, the first computing device 100a to the $N^{th}$ computing device 100N).

The operations illustrated in FIGS. 8 and 9 are illustrative. Accordingly, it will be apparent to those skilled in the art that some of the operations in FIGS. 8 and 9 may be omitted or additional steps may be present without departing from the scope of the spirit of the present disclosure.

The specific details of the configurations 100a to 700 described in FIGS. 8 and 9 may be substituted for those previously described with reference to FIGS. 1 to 7.

As described above with reference to FIGS. 1 to 8, the first computing device 100a may determine a CAN ID by using the CAN ID table, time point, or the like shared across the plurality of computing devices (for example, the first computing device 100a to the $N^{th}$ computing device 100N), and may change the CAN ID at each certain shared time point. Thus, it may be difficult and impossible for an attacker computing device to analyze CAN messages even if the attacker computing device eavesdrops on CAN messages transmitted through the bus 200.

The first computing device 100a may generate the dummy CAN message by using the hash algorithm, seed value, or the like shared across the plurality of computing devices (for example, the first computing device 100a to the $N^{th}$ computing device 100N). Thus, even when an attacker computing device eavesdrops a CAN message transmitted through the bus 200, it may be difficult and impossible for the attacker computing device to analyze whether the content of the CAN message is dummy data or normal data.

FIG. 10 is a simple and general schematic diagram illustrating an example of a computing environment in which exemplary embodiments of the present disclosure are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will well appreciate that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The exemplary embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transmission medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an EPROM, and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an exterior mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least three devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection.

The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art will appreciate that the various illustrative logical blocks, modules, processors, means, circuits, and algorithm operations described in relationship to the exemplary embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various exemplary embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented exemplary embodiments is provided so as for those skilled in the art to use or carry out the present disclosure. Various modifications of the exemplary embodiments may be apparent to those skilled in the art, and general principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics presented herein.

What is claimed is:

1. A method of obfuscating a Controller Area Network (CAN) message performed by a first computing device including a processor, the method comprising:
    obtaining a first index from a first input value corresponding to a first time point by using an index output algorithm;
    determining a first CAN ID of the first computing device corresponding to the first index based on a predetermined CAN ID table;
    generating a first normal CAN message including the first CAN ID and first normal data; and
    generating a first dummy CAN message including the first CAN ID and first dummy data that is different from the first normal data,
    wherein the generating of the first dummy CAN message comprises:
    obtaining a hash value from a third seed value by using a second hash algorithm;
    generating the first dummy data that is input in a payload field of the first dummy CAN message based on the hash value; and
    generating the first dummy CAN message including the first CAN ID and the first dummy data,
    wherein the second hash algorithm and the third seed value are shared in advance by a plurality of computing devices connected to each other through a bus of the CAN and including the first computing device.

2. The method of claim 1, further comprising:
    at a second time point different from the first time point, obtaining a second index from a second input value including a second seed value corresponding to the second time point by using the index output algorithm;
    determining a second CAN ID of the first computing device corresponding to the second index based on the predetermined CAN ID table; and
    generating a second normal CAN message including the second CAN ID and second normal data.

3. The method of claim 2, wherein the second time point is shared in advance by a plurality of computing devices that is connected to each other through a bus of CAN and include the first computing device.

4. The method of claim 1, wherein the index output algorithm includes at least one of a modular arithmetic algorithm and a first hash algorithm capable of outputting N to M integer indices, and N and M are integers.

5. The method of claim 1, wherein the index output algorithm, the predetermined CAN ID table, and the first time point are shared in advance a plurality of computing devices connected to each other through a bus of CAN and including the first computing device.

6. The method of claim 1, wherein the first input value includes a first seed value including a first time value corresponding to the first time point.

7. The method of claim 1, further comprising:
    after the generating of the first dummy CAN message, transmitting the first normal CAN message and the first dummy CAN message to the plurality of computing devices connected through a bus of the CAN.

8. The method of claim 1, further comprising:
    obtaining a CAN message generated by a second computing device of a plurality of computing devices connected to each other through a bus of CAN and including the first computing device;
    obtaining a hash value from a third seed value by using a second hash algorithm;
    determining whether first data obtained based on the hash value corresponds to second data obtained from a payload field of the CAN message; and
    when the first data corresponds to the second data, determining the CAN message as a second dummy CAN message including second dummy data and deleting the CAN message, and the second hash algorithm and the third seed value are shared in advance by the plurality of computing devices including the first computing device and the second computing device.

9. The method of claim 8, further comprising:
when the first data does not correspond to the second data, determining the CAN message as a third normal CAN message including third normal data.

10. A computer program stored in a computer-readable storage medium, the computer program including operations to cause a processor of a first computing device for performing obfuscation of a Controller Area Network (CAN) message to perform following operations, the operation comprising:
obtaining a first index from a first input value corresponding to a first time point by using an index output algorithm;
determining a first CAN ID of the first computing device corresponding to the first index based on a predetermined CAN ID table;
generating a first normal CAN message including the first CAN ID and first normal data; and
generating a first dummy CAN message including the first CAN ID and first dummy data that is different from the first normal data,
wherein the generating of the first dummy CAN message comprises:
obtaining a hash value from a third seed value by using a second hash algorithm;
generating the first dummy data that is input in a payload field of the first dummy CAN message based on the hash value; and
generating the first dummy CAN message including the first CAN ID and the first dummy data,
wherein the second hash algorithm and the third seed value are shared in advance by a plurality of computing devices connected to each other through a bus of the CAN and including the first computing device.

11. A first computing device for obfuscating a Controller Area Network (CAN) message, the first computing device comprising:
a processor including at least one core;
a memory for storing a computer program executable by the processor; and
a network unit,
wherein the processor obtains a first index from a first input value corresponding to a first time point by using an index output algorithm,
determines a first CAN ID of the first computing device corresponding to the first index based on a predetermined CAN ID table, and
generates a first normal CAN message including the first CAN ID and first normal data, and
generates a first dummy CAN message including the first CAN ID and first dummy data that is different from the first normal data,
wherein the generating of the first dummy CAN message comprises:
obtaining a hash value from a third seed value by using a second hash algorithm;
generating the first dummy data that is input in a payload field of the first dummy CAN message based on the hash value; and
generating the first dummy CAN message including the first CAN ID and the first dummy data,
wherein the second hash algorithm and the third seed value are shared in advance by a plurality of computing devices connected to each other through a bus of the CAN and including the first computing device.

* * * * *